A. B. Shepard,
Water Wheel,
№ 78,488.     Patented June 2, 1868.
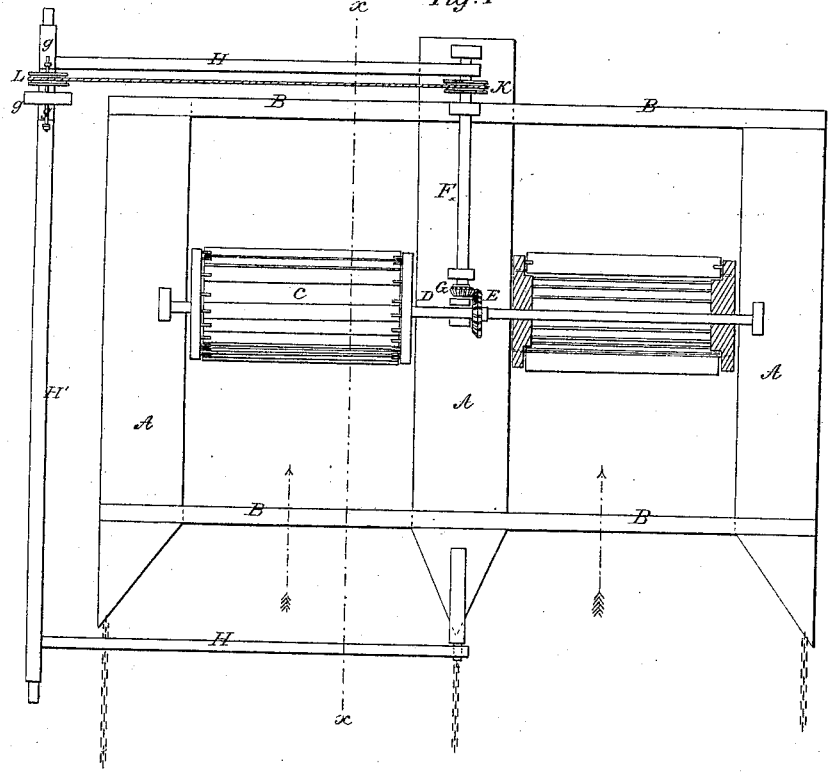
Fig: 1
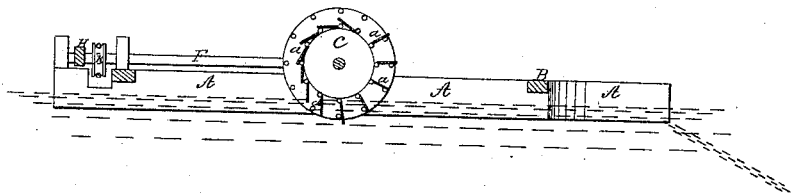
Fig: 2
Witnesses:
W. C. Ashkettle
J. Fraser
Inventor:
A. B. Shepard
per Munn & Co
attorneys

United States Patent Office.

ALBERT B. SHEPARD, OF SAND BANK, NEW YORK.

Letters Patent No. 78,488, dated June 2, 1868.

---

IMPROVED FLOATING WATER-POWER.

---

The Schedule referred to in these Letters Patent and making part of the same.

---

TO ALL WHOM IT MAY CONCERN:

Be it known that I, ALBERT B. SHEPARD, of Sand Bank, in the county of Oswego, and State of New York, have invented a new and improved Floating Water-Power; and I do hereby declare that the following is a full, clear, and exact description thereof, which will enable others skilled in the art to make and use the same, reference being had to the accompanying drawings, forming part of this specification.

This invention relates to a new and improved method of constructing apparatus for utilizing and economizing the power of running waters upon rivers or streams which are liable to great and sudden changes in depth. In the accompanying plate of drawings—

Figure 1 is a plan view of my invention.

Figure 2 is a longitudinal section of the same, taken in the line $x\ x$, fig. 1.

Similar letters of reference indicate corresponding parts.

One or more floats or scows A, having sufficient buoyancy in water to support the superincumbent weight, are connected together by cross-pieces B, as shown in the drawing. Between each pair of said floats A, and rotating in suitable bearings upon the same, are one or more undershot water-wheels C.

The water-wheels C may be of any number and size, according to the power wanted, and are of any of the forms of tide-wheels now in common use, and are rigidly secured to and are connected together by a main shaft, D, which extends across from one float A to another of said floats A.

Upon the shaft D is keyed, at any convenient point, a bevel-geared pinion, E, upon any one of the floats A; and rotating in suitable bearing thereon, is a shaft, F. The shaft F is at right angles to the shaft D, and is connected therewith by a bevel-geared pinion, G, keyed upon the end of the shaft F, fitting into the pinion E, as shown.

To the float A upon which is the shaft F, and turning upon suitable bearings on the said float, in a line having the same centre as the centre of the shaft F, is a rocking or vibrating-frame, H, the cross-bar H' of the same being supported in suitable bearings upon the shore, in which said bearing said cross-bar H' is permitted a rocking-motion.

The object of this arrangement being to permit a slight rising and falling of the floats A with the water, without moving the cross-bar H'.

Upon the cross-bar H', and rotating in suitable bearing on the same, is a counter-shaft, I. Keyed to counter-shaft I, are the pulleys J and L, and upon the shaft F is also keyed another pulley K, in the same straight line with the pulley L, as shown. The pulleys K and L are connected together by a belt.

From the pulley J motion may be communicated to any shafting on the shore. The whole is secured to the shore by chains or in other convenient way.

The operation is such that a rotating motion being given to the wheels C by the current of the stream, the same is communicated to the shafting on shore, the rocking of the frame H permitting the float A to rise or fall, without moving the cross-bar H', or injury to the same, or the belting or any of the parts.

As above stated, any of the common water-wheels may be used, but I have found a wheel constructed as shown in the drawing, to be more efficient, which is described as follows:

Between any two heads or disks secured to any main shaft D, are pivoted, by one or the inside edge, any convenient number of buckets $a$, and upon the face of the heads or disks, are pins so placed as shown in the drawing, as to hold the bucket only against pressure upon one side of same, consequently permitting the buckets $a$ to fall, and present less resistance to the rotation of the wheel, when the buckets $a$ are leaving the water.

V-shaped fenders may be attached to the up-stream ends of the floats, to protect the wheels from drift-wood and the like.

Any suitable gates may be placed before the wheels to stop them at will.

Having thus described my invention, what I claim as new, and desire to secure by Letters Patent, is—

The arrangement, upon the floats A A A, of the wheels C, keyed upon the shaft D, having the gear-wheel E, the shaft F having the bevelled pinion G and pulley K, the hinged frame H supporting the pulley-shaft $g$, and attached to the shore by the shaft H', as herein described for the purpose specified.

ALBERT B. SHEPARD.

Witnesses:
O. R. JOSLIN,
L. W. ALDRICH.